Patented Mar. 11, 1941

2,234,642

UNITED STATES PATENT OFFICE 2,234,642

CEMENT-BITUMEN GROUT

John Frederick Thomas Blott and John Alfred Rawlinson, London, England, assignors to Shell Development Company, San Francisco, Calif., a corporation of Delaware No Drawing. Application April 29, 1939, Serial No. 270,904. In Great Britain May 14, 1938

8 Claims. (Cl. 106—31)

In the production of cement-bitumen grouts and slurries it has previously been proposed to use bitumen dispersions of relatively high stability. Mixtures made with such dispersions are quite satisfactory for many purposes when prepared with the stable bitumen dispersions of commerce. In other cases, however, they may be deficient in flow properties when prepared in a fluid consistency, which would enable them to be pumped or otherwise handled over periods of time, while remaining homogeneous as regards the distribution of bitumen and cement particles within their bulk.

For many purposes, and particularly for the operation of grouting the steel rings employed in the construction of tunnels, it is required to be able to prepare such fluid mixtures of bitumen and cement in a given pan or receptacle, and to transfer these by pumping or flow under air pressure, through suitable pipes, to areas more or less remote from the place of preparation of the mixtures. Furthermore, during this transference the mixes should remain free from sedimentational separation of bitumen or cement from the whole, and the rate at which the hydraulic set of the cement takes place should be such as to offer no difficulties due to partial solidification during transference, but on the contrary the set should take place at a more or less well-defined time when the mixture has assumed its final position, as, for instance, behind the rings of the tunnel.

It has now been found that mixtures having the necessary flow properties, freedom from separation of constituents and controllable time of hydraulic set may be produced by the use of special bitumen dispersions which are prepared from a previously made bitumen dispersion which has been stabilised with the aid of casein or the like and which is thereupon treated with formaldehyde and maintained at a high temperature, for an extended period, cooled down and incorporated with a suitable quantity of an alkali carbonate, preferably sodium carbonate.

The initial bitumen dispersion may, for instance, be prepared in a known way with the aid of a suitable soap, such as a suitable naphthenic acid soap or rosin soap, and stabilised with casein or the like, or with the aid of an alkali peptised casein solution or the like in which the alkali is neutralised during or after emulsification by the diffusion from the bitumen of a suitable organic acid which has been added to the bitumen prior to emulsification or, alternatively, by the addition of a suitable mineral or organic acid to the dispersion.

A specific example of the preparation of a bitumen dispersion according to the invention is described herebelow.

Bitumen of, for instance, 200 penetration is first mixed with a quantity of naphthenic acid and is then emulsified in the known way in a 2% casein solution containing a proportion of about $N/16$ caustic potash, to produce a bitumen dispersion of the usual content, viz. approximately 55% of bitumen. The quantity of naphthenic acid is so calculated that the total weight of caustic potash used in the casein solution is just neutralised. The naphthenic acid should preferably be selected from the products of refining a light fraction of the distillation products of mineral oil; it should have a relatively low molecular weight, and thus a high acid value. Not all the qualities of naphthenic acid (or other acidic soap-forming substances, e. g. rosin) being suitable for the present process, the selection of a suitable grade may be made on the basis of trial and error; preference may be given to such naphthenic acids of low molecular weight which yield coarser dispersions, as a relatively coarse dispersion generally tends to accelerate the set of the cement mix.

As, from time to time, it may not be possible to secure naphthenic acids of a type precisely suited to the production of emulsions which produce rapid set of the cement mixes in which they are incorporated, it is useful to have an additional means of control. It has been found that variation of the alkali concentration employed in making the casein solution used as emulsifier does provide a means to this end and it should be noted that with any one type of naphthenic acids this control is exercised in the sense that an increasing concentration of alkali produces an increasingly finer dispersion and thus a retardation of the setting of the cement mixes.

For instance, in a particular case, an emulsion was prepared using a particular grade of naphthenic acids and with a casein solution containing 2% of casein and 0.0625 $N$ caustic potash. This emulsion had a mean particle size of 2.58 $\mu$ and a stiffening time of the cement mix of over 3½ hours. Another emulsion made with the same naphthenic acids, but with a casein solution containing 2% of casein and 0.05 $N$ caustic potash, had a mean particle size of 3.08 $\mu$ and stiffening time of the cement mix of 24 minutes.

Control by using variations in the concentration of alkali may, therefore, be used to deal with otherwise slightly unsuitable naphthenic acids or may be used with suitable naphthenic acids to control the final rate of set.

The bitumen dispersion thus prepared is converted into a specially stabilised dispersion for use according to the invention by the addition, whilst it is still at the high temperature required for its preparation, of about 0.6% by weight of 40% formaldehyde solution (commercial formalin), and by subsequent maintenance of this temperature for an extended period, for instance 24 to 48 hours. The effect of this treatment is to produce a dispersion which is stable to the addition of concentrated alkali solution, the treatment producing a protective agent which is not decomposed by alkali, as a result of a reaction between the formaldehyde and the casein, the latter being present in a form suitable for the reaction as a result of the neutralisation of the alkali in which it was originally peptized by the diffusion of the added naphthenic acids from the bitumen. After cooling there is added to the bitumen dispersion a quantity of sodium carbonate, which will usually be of the order of 5% of anhydrous sodium carbonate by weight of the finished dispersion. Normally the sodium carbonate will be added as a solution in water, this solution being prepared at such a concentration that after the addition has been effected the bitumen content of the final dispersion will be about 45%. It is found in practice that bitumen dispersions of about this concentration are the most suitable for preparing the cement mixes. This quantity of sodium carbonate will, however, normally be varied to yield an emulsion which gives the time of setting required when used with a given cement, and under any given set of working conditions. The quantity of sodium carbonate added constitutes in effect the control over the setting properties of the finished mix.

The bitumen dispersion thus prepared may be used, either undiluted or after dilution with water, for preparing a cement-bitumen grout just in the same way as the water of a normal cement grout. A typical mix will contain one bag of cement (112 lbs.) and 12 gallons of the above bitumen dispersion, to produce a grout containing approximately 33% of bitumen, calculated on the mixture of bitumen and dry cement.

Such mixtures of the new bitumen dispersion may, for instance, be used for grouting the back of tunnel rings in order to keep these in place in the shafts bored by the cutting shields. The mixture being formed in an ordinary cement mixing pan is injected under pressure into the tunnel shaft and there allowed to set, thus yielding a grout having a certain plasticity, which enables it to resist small movements without cracking, coupled with self-healing properties, which ensure that if cracks develop, they will heal again where there is a sufficient pressure acting upon them to effect this result. The great advantage obtained thereby is that the percolation of water from the surrounding soil through cracks in the cement grout may be avoided altogether, or greatly diminished.

What we claim is:

1. In the process of preparing a stable bitumen-in-water dispersion wherein bitumen and an aqueous emulsifier solution are mixed at an elevated temperature and are stabilized with casein, the improvement comprising adding formaldehyde to said dispersion while hot, maintaining the resulting mixture at the elevated temperature for a period sufficiently long to react the formaldehyde with the casein, and thereafter incorporating into the resulting dispersion an alkali carbonate.

2. The process of claim 1 in which the bitumen-in-water dispersion is stabilized with an alkali peptized casein solution.

3. The process of claim 1 in which the emulsifier is a soap.

4. The process of claim 1 in which the emulsifier is a soap of a relatively low-molecular weight naphthenic acid derived from light mineral oil fractions.

5. The process of claim 1 in which about 0.6% by weight of 40% formaldehyde is added to the dispersion.

6. The process of claim 1 in which about 5% of anhydrous sodium carbonate is added to the treated dispersion.

7. The process of claim 1 in which the time of reaction is 24 to 48 hours.

8. In the process of preparing an improved cement-bitumen grout wherein a casein stabilized bitumen dispersion prepared with an aqueous emulsifier solution at an elevated temperature is mixed with cement in the ratio of about one to two by weight of bitumen and dry cement, the improvement comprising adding formaldehyde to the bitumen dispersion while hot, maintaining the resulting mixture at the elevated temperature for a period sufficiently long to react the formaldehyde with the casein, and incorporating into the resulting dispersion an alkali carbonate.

JOHN FREDERICK THOMAS BLOTT.
JOHN ALFRED RAWLINSON.